United States Patent
Hiratzka et al.

(10) Patent No.: US 7,451,258 B1
(45) Date of Patent: Nov. 11, 2008

(54) ROTATING PRIORITY QUEUE MANAGER

(75) Inventors: T. Douglas Hiratzka, Coralville, IA (US); Philippe M. Limondin, Cedar Rapids, IA (US); Mark A. Bortz, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 342 days.

(21) Appl. No.: 11/508,499

(22) Filed: Aug. 23, 2006

(51) Int. Cl.
*G06F 13/00* (2006.01)
(52) U.S. Cl. ............... 710/111; 710/112; 710/316; 710/244; 710/38; 710/39
(58) Field of Classification Search ......... 710/109–113, 710/37–40, 309–317, 240–244
See application file for complete search history.

(56) References Cited

U.S. PATENT DOCUMENTS

| | | | | |
|---|---|---|---|---|
| 4,924,380 A | * | 5/1990 | McKinney et al. | 710/111 |
| 5,564,062 A | * | 10/1996 | Meaney et al. | 710/244 |
| 6,160,812 A | * | 12/2000 | Bauman et al. | 370/416 |
| 7,143,219 B1 | * | 11/2006 | Chaudhari et al. | 710/111 |
| 2006/0277330 A1 | * | 12/2006 | Diepstraten et al. | 710/40 |

* cited by examiner

*Primary Examiner*—Raymond N Phan
(74) *Attorney, Agent, or Firm*—Nathan O. Jensen (57) ABSTRACT

The present invention is a rotating priority queue manager. A rotating priority queue manager in accordance with the present invention may include a plurality of source data channels, a corresponding plurality of processing resources, and an arbitrating interface directing the flow of data from the source channels to the processing resources where the data must flow over a shared data path.

The plurality of processing resources may comprise any system of parallel processors where the servicing of input data must be carried out in a manner where there the maximum latency for processing a given data channel is determinable, the arbitration between channels is equal, no input channel may prevent another channel from being serviced, and lower priority processing resources are not prohibited from receiving input data if higher priority processing resources are not currently available or if higher priority data is not currently available.

30 Claims, 4 Drawing Sheets

ROTATING PRIORITY QUEUE MANAGER

FIELD OF THE INVENTION

This invention relates generally to processing systems and more particularly to systems where multiple data inputs are concurrently feeding multiple processing resources (on a one-to-one basis) where the data must flow over a shared data path.

BACKGROUND OF THE INVENTION

Today's data-intensive audio, video and communications applications require high-bandwidth systems capable of real-time processing. As such, a primary goal in the design of modern processing units is maximizing throughput.

One of the most prevalent mechanisms for enhancing throughput in computing machines is the use of parallel processing. Parallel processing is the simultaneous execution of a set of tasks (split up and specially adapted) on multiple processors on multiple data segments in order to obtain results faster.

Systems having multiple interfaces linking the data sources and the processing resources are generally disfavored in circuit design as they can result in routing and pin congestion issues in application specific integrated circuits (ASIC). Routing a high number of signals requires physical space which is always at a premium in today's ever shrinking processing units. Likewise, for a given physical package, a predetermined pin count may already exist.

Instead, single-interface systems are commonly implemented. These single-interface systems utilize a data routing arbitration mechanism to establish a channel hierarchy to facilitate the transfer of data from multiple sources to multiple processors across a shared data path. Such systems, while more complex, require less board space and are more flexible in adapting to the pin requirements of existing physical packages.

However, the use of single-interface systems may also operate as a bottleneck to the required rapid transmission of data. In order to achieve the benefits of parallel computing, it is imperative that data routing to the respective processors occur in an efficient manner. The efficiency of the data arbitration algorithm is a primary factor in determining the overall throughput of a given parallel system. If only a few data and processing channels are allowed to dominate the interface, there is little or no advantage to incorporating a parallel system. Additionally, processors may require varying amounts of time to process certain data elements. As such, data channels must be routed to the various processors in a judicious manner such that no processing channel is starved if its corresponding data channel has pending data and, similarly, no pending data is blocked if its corresponding processing channel is requesting data.

An example of an application in which multiple parallel requesters are accessing a single resource, where a fair (equal priority) arbitration scheme is desired is cryptography. Cryptography systems are often utilized to prevent the interception of data when transmitted over public networks. The systems scramble data to prevent unauthorized access. Data segments may be processed by one of a plurality of encoders and then again by one of a plurality of decoders. Due to the nature of encrypt/decrypt systems, a given block of data may take more or less time to process than another block of equal size. As such, a cryptographic system must be able to route any data source channel to its corresponding processing channel at any time in order to maximize throughput.

However, the task of coordinating which data segments are to be routed to a given processor can be a complex task. For this reason, many priority schemes have been developed and implemented which govern the direction of data to associated parallel processors.

Simple static arbitration schemes have been used to direct data source channels having varying degrees of priority. In such schemes, when an interface receives an indication that data is pending on a high-priority channel, the transmission of data on lower-priority channels to the processors is halted until the higher-priority data is processed. However, this scheme is ineffective in applications where there is no inherent priority between the source channels (i.e. fair arbitration).

Additionally, dynamic rotating arbitration schemes have also been utilized in source data routing. These schemes are generally capable of varying their channel priority hierarchy. However, such systems, while more robust in their ability to handle priority-associated data sources, still suffer from the same channel-priority dependence as the static schemes. Their priority decisions, while fluid in nature, remain dependent on a predetermined dynamic rotation. Such schemes are unable to make decisions based on data source availability and processing resource readiness.

Therefore, it would be desirable to provide a system and a method for arbitrating between multiple data source/processing resource channels where the channels have equal priority, the arbitration has a determinable maximum latency, and no processing channel is starved or blocked.

Further, it would be desirable to provide a system and a method for arbitrating between multiple data source/processing resource channels where the availability of the data source and processing resources dictate the function of the arbitration.

SUMMARY OF THE INVENTION

Accordingly, the present invention is directed to a rotating priority queue manager. In general, the invention applies to systems wherein multiple inputs concurrently feed multiple processing resources which are organized to process data in a parallel arrangement where the data must flow over a shared data path.

In an embodiment of the invention, a priority queue manager may include a plurality of n data source channels, a corresponding plurality of n processing resource channels, and an arbitrating interface directing the flow of data from the source channels to the processing resources. Each corresponding data source/processing resource channel pair has an assigned common channel number.

The plurality of processing resources may comprise any system of parallel processors where the servicing of input data must be carried out in a manner where the maximum latency for processing a given data channel is determinable, the arbitration between channels is equal, no input channel may prevent another channel from being serviced, and lower priority processing resources are not prohibited from receiving input data if higher priority processing resources are not currently available or if higher priority data is not currently available. In a particular embodiment, the plurality of processors comprises multiple encrypt/decrypt engines for the encryption or decryption of data.

The arbitration interface comprises a Rotating Priority Queue (RPQ). The RPQ is comprised of a series of logic gates and a plurality of n-bit priority registers. Each of the n priority registers has a designated priority from highest ($PR_1$) to lowest ($PR_n$). The registers may be initialized with n-bit binary numbers as follows: $PR_1=2^0$, $PR_2=2^1$, $PR_3=2^2$, . . . $PR_{n-1}=2^{n-2}$, $PR_n=2^{n-1}$, or generally $PR_i=2^{i-1}$, where i=1 to n.

The contents of these registers determine which of the n data source/processing resource channel pairs is assigned a given priority at a given time. Each of the priority registers maintains a value where only one of the n-bits is asserted as '1' at any given time. The position of the asserted bit is defined such that the least significant bit is bit zero and the most significant bit is bit n−1. When the position of an asserted bit corresponds to the common channel number of a given data source/processing resource channel pair, that channel pair is assigned a priority equal to that of the associated priority register.

For example, assuming 4-bit priority registers, if $PR_1$ initially contained the binary value "0001" where the '1' was in the bit-0 position, data source/processing resource channel 1 would be of the highest priority. $PR_2$-$PR_4$ would contain "0010", "0100", and "1000" respectively, indicating data source/processing resource channels 2, 3 and 4 would have second, third, and fourth highest priorities respectively.

Likewise if $PR_1$ initially contained the binary value "0100" where the '1' was in the bit-2 position, data source/processing resource channel 3 would be of the highest priority. $PR_2$-$PR_4$ would contain "1000", "0001", and "0010" respectively, indicating data source/processing resource channels 4, 1 and 2 would have second, third, and fourth highest priorities respectively.

The RPQ makes arbitration decisions for directing input source data to the corresponding processing resources based on the contents of the priority registers $PR_1$-$PR_n$ and status signals received by the RPQ indicating the availability of data from the source channels and the readiness of the processing resources. This is accomplished through the use of "ready" (RDY) signals issued by the data sources and "request" (REQ) signals issued by the processing resources. When a given data source channel has data to be processed, it issues a RDY signal to the RPQ. When a given processing resource channel is ready to accept new data, it issues a REQ signal to the RPQ.

If both a RDY and a REQ signal are pending for the channel specified by $PR_1$ (i.e. the channel currently assigned as the highest priority), then the RPQ will set the n-bit SEL output signal such that the bit corresponding to the channel specified by $PR_1$ is asserted and all other bits are zero. Additionally, the contents of the n priority registers will be "rotated" by one bit. Rotating consists of moving the asserted bit in a priority register to the next greater position of significance.

For example, assuming 4-bit priority registers, if $PR_1$-$PR_4$ contain the binary numbers "0100", "1000", "0001" and "0010" and RDY and REQ signals were pending for channel 3, SEL would be set as "0100." The SEL signal would be routed to the switching circuitry which would allow data source/processing resource channel 3 to access the shared data path. Additionally, as the selected channel was associated with $PR_1$, the priority registers would be rotated by one bit. Rotation by one bit would result in priority registers $PR_1$-$PR_4$ having new values "1000", "0001", "0010" and "0100" respectively. Therefore, data source/processing resource channel 4 would now be assigned the highest priority for the next round of arbitration.

Similarly, if either a RDY or a REQ signal are not pending for the channels specified by $PR_1$-$PR_{i-1}$ (i.e. the data source/processing resource channels currently assigned as the highest priority through the i−1$^{th}$ priority) but both a RDY and a REQ signal are pending for the data source/processing resource channel specified by $PR_i$ (i.e. the data source/processing resource channel currently assigned as the i$^{th}$ highest priority) then the RPQ will set the n-bit SEL output signal such that the switching circuitry would allow the data source/processing resource channel specified by the contents of $PR_i$ to access the shared data path. The contents of the n priority registers are also rotated by i bits.

For example, assuming 4-bit priority registers, if $PR_1$-$PR_4$ contain the binary numbers "0100", "1000", "0001" and "0010" and RDY and REQ signals were pending only for channel 1, the SEL signal would be routed to the switching circuitry which would allow data source/processing resource channel 1 access to the shared data path. Additionally, the priority registers would be rotated three bits such that $PR_1$-$PR_4$ would have new values "0010", "0100", "1000" and "0001" respectively. Therefore, data source/processing resource channel 2 would now be assigned the highest priority and most recently processed channel 1 would be assigned the lowest priority.

In another embodiment of the invention, the calculation of the SEL signal output and the rotation of the priority registers occurs in such a manner that, in the event that more than one data source/processing resource channel pair have RDY and REQ signals pending simultaneously, the maximum latency for processing the lowest priority channel is bounded, deterministic, and minimal. In another embodiment, this maximum latency is determined solely by the number of channels in the system and not the level of activity on the channels. In still another embodiment, the maximum latency is n clock cycles where n is the total number of channels.

In another embodiment of the invention, the design of the RPQ ensures that the channel which has just been designated for processing will have the lowest priority for the next round of arbitration. This results in an arbitration scheme having an inherent fairness where no single channel is given preference over another except as a result of the actual capabilities/needs of the channels.

In another embodiment of the invention, the design of the RPQ ensures that no channel may be prevented from being serviced (i.e. "starved") by other channels, even one making high-rate requests (possibly every clock tick). In a system with n channels, the design bounds the potential wait for access to the interface at n clock ticks as all the other channels are serviced, at most, one time each.

In another embodiment of the invention, in the event that a channel pair is signaling both REQ and RDY, the channel must be serviced immediately if, in the current priority state defined by the priority registers, no higher priority channel is eligible for processing. In other words, the absence of pending REQ or RDY signals for higher priority channels does not prevent shared data path access by lower priority channel that has REQ and RDY signals pending.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made, in detail, to presently preferred embodiments of the invention, an example of which is illustrated in the accompanying drawings.

Figure 1:
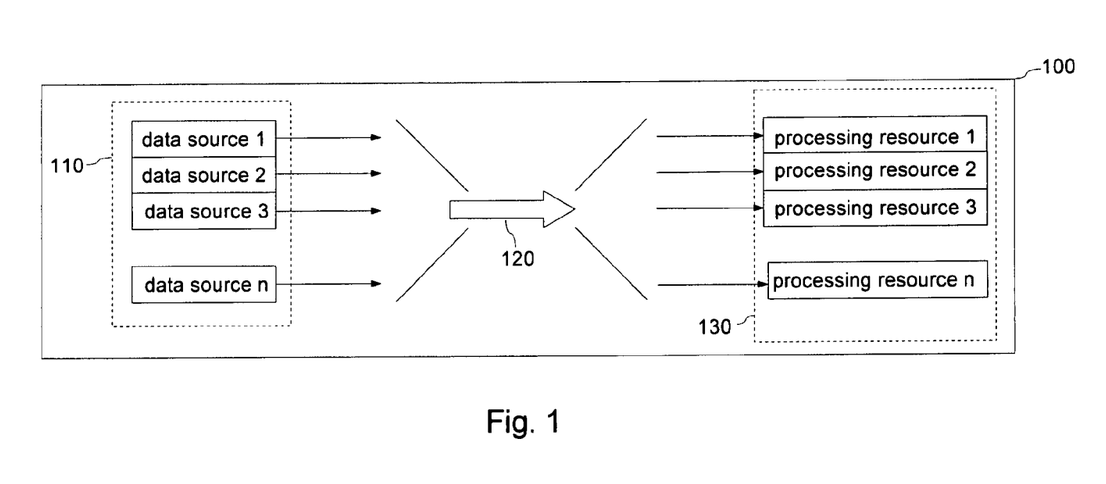
FIG. 1 depicts a high-level view of a data flow wherein a plurality of input data source channels are arbitrated and transmitted across a shared data path for processing by a plurality of processing resource channels.

Referring to FIG. 1, a high-level illustration of a single-interface data arbitration mechanism 100 in accordance with an embodiment of the present invention is presented. A plurality of n data source channels 110 is transmitted across a shared data path 120 for distribution to a plurality of n corresponding processing resource channels 130. Each of the n data source channels 110 is independently mapped to one of the n processing resource channels 130. The n processing resource channels 130 may comprise any system of parallel processors where the servicing of input data must be carried out in a manner where there the maximum latency for processing a given data channel is determinable, the arbitration between channels is equal, no data source channel 110 may prevent another data source channel 110 from being serviced, and lower priority processing resource channels 130 are not prohibited from receiving input data if higher priority processing resource channels 130 are not currently available. In a particular embodiment, the plurality of processors comprises multiple encrypt/decrypt engines for the encryption or decryption of data.

Figure 2:
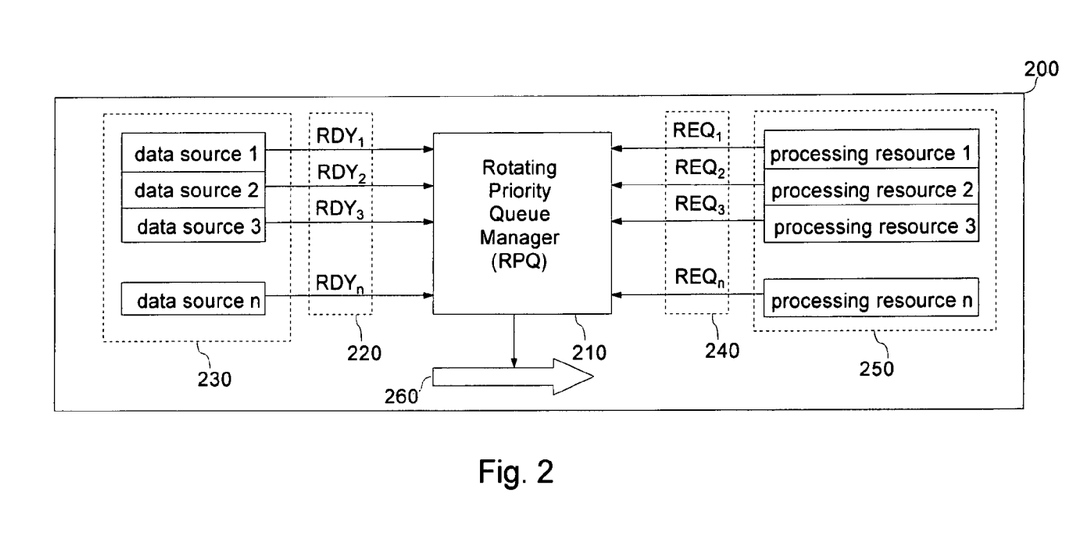
FIG. 2 depicts a high-level view of a data arbitration system in accordance with an embodiment of the present invention, wherein the Rotating Priority Queue Manager (RPQ) receives "ready" (RDY) signals from data sources, "request" (REQ) signals from the processing resources, and permits access to a shared data path by the data source/processing resource pair.

Referring to FIG. 2, a high-level view of a data arbitration system 200 in accordance with an embodiment of the present invention is presented. The Rotating Priority Queue Manager (RPQ) 210 receives "ready" (RDY) signals 220 from data source channels 230 and "request" (REQ) signals 240 from processing resource channels 250. When a RDY signal 220 and a REQ signal 240 are received for the same channel, the RPQ determines the current priority of that channel as maintained by the RPQ. If no channels having a higher priority than the subject channel have both REQ and RDY signals pending, the data source/processing resource channel pair is permitted access to the shared data path 260. If a channel having a higher priority than the subject channel has both REQ and RDY signals pending, the data source/processing resource channel pair must wait until the channel priorities have been rotated by the RPQ such that there are no channels with higher priorities than the subject channel which have both REQ and RDY signals pending.

Figure 3:
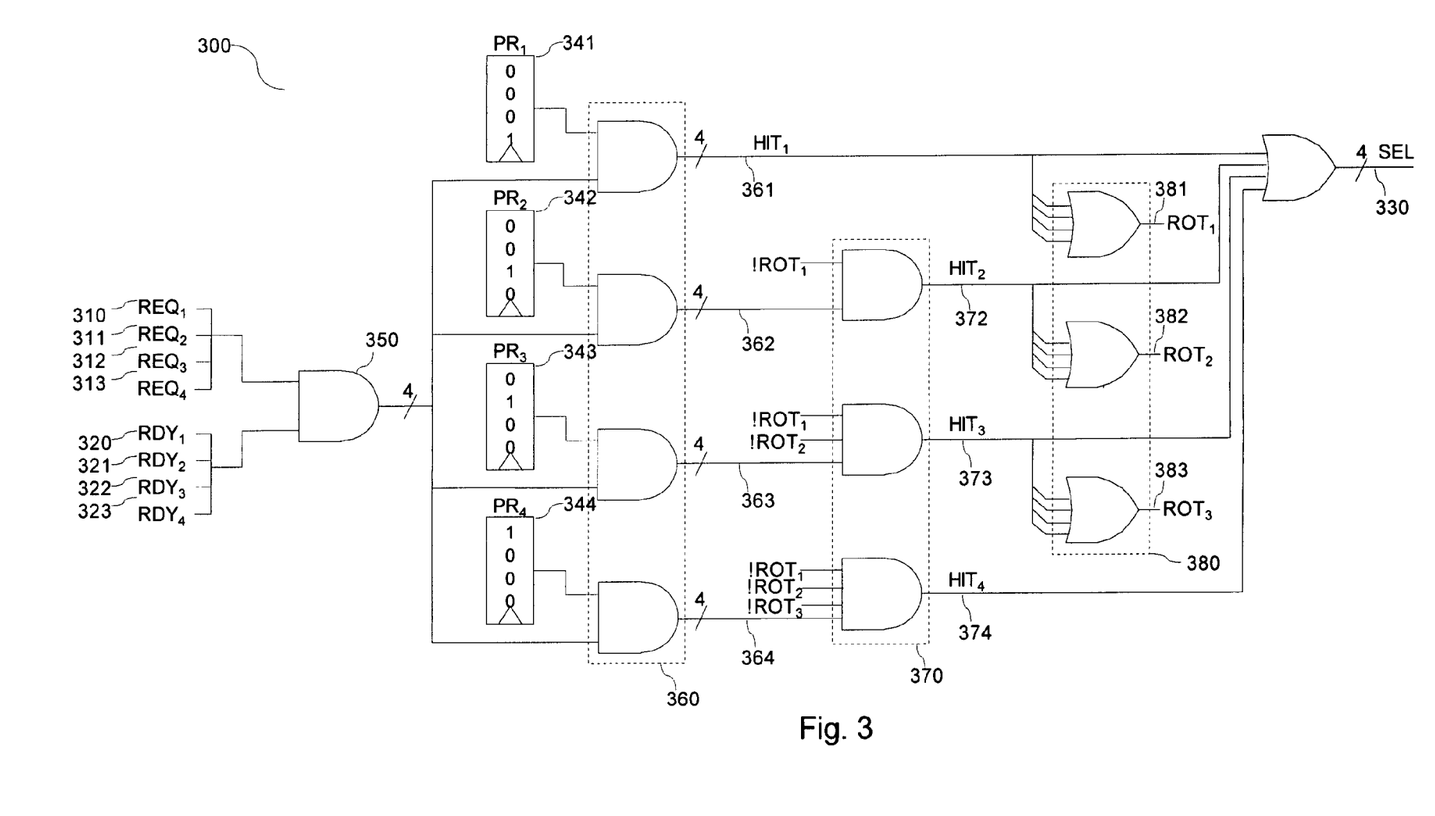
FIG. 3 depicts a schematic representation of a logic-gate level implementation of an RPQ in accordance with an embodiment of the present invention.

Referring to FIG. 3, a schematic representation of a logic-gate level implementation of a Rotating Priority Queue (RPQ) system 300 in accordance with an embodiment of the present invention is presented. FIG. 3 depicts a representative design for the case of four input data source channels. However, the design is easily extensible to n data source channels which correspond to n processing resource channels.

Processing resource channels may issue a request (REQ) signal 310-313 when they are prepared to accept input data. Data source channels may issue a ready (RDY) signal 320-323 when input data is valid and ready to be processed. The output of the RPQ is a four-bit vector SEL 330 containing at most one bit asserted. The SEL signal is routed to switching circuitry which regulates data source/processing resource channel access to the shared data path. The asserted bit in the SEL signal indicates which channel is permitted access (i.e. the assertion of bit-2 permits channel 3 to access the shared data path.)

Figure 3A:
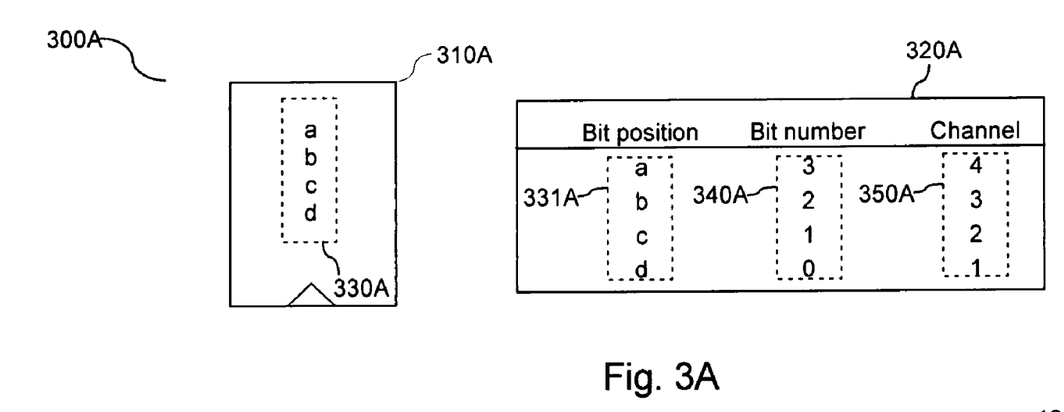
FIG. 3A depicts a detailed view of the contents of priority registers $PR_1$ through $PR_4$ shown in FIG. 3, showing a possible mapping of bit positions to channel numbers in accordance with an embodiment of the present invention.

Priority registers $PR_1$-$PR_4$ 341-344 maintain binary values wherein only one bit is asserted at a given time. Each bit of the four-bit register corresponds to a data source/processing resource channel (i.e. bit zero to channel one, bit one to channel two, etc.) An example of this mapping scheme is depicted in FIG. 3A.

Priority register $PR_1$ 341 may initially contain the binary value "0001", with the '1' in bit-zero indicating that channel one currently is of the highest priority. $PR_2$ 342 may initially contain "0010", with the '1' in bit-one indicating channel two is of second highest priority. Similarly, registers $PR_3$ 343 and $PR_4$ 344 maintain values corresponding to the third and the fourth priority channels, respectively.

The output of the first AND gate 350 reports which channels have pending REQ and RDY signals. The outputs 361-364 of the column of four AND gates 360 fed by priority registers 341-344 indicate whether the channel which currently has the particular priority specified by a given priority register has both a pending RDY and REQ.

The three AND gates 370 (5, 6 and 7-bit AND gates respectively) and their resulting signals $HIT_2$-$HIT_4$ 372-374 combined with the three OR gates 380 and their resulting signals $ROT_1$-$ROT_3$ 381-383 (and their inverses $!ROT_1$-$!ROT_3$) define the four prioritization levels.

For example, if both a RDY and a REQ are pending for the channel specified by register $PR_1$ 341, (i.e. $REQ_1$ 310 and $RDY_1$ 320 are asserted and $PR_1$="0001") then $HIT_1$ 361 will be nonzero, and $ROT_1$ 381 will be a '1'. In this case, the contents of all four priority registers will be rotated by one bit. If $PR_1$ 341 initially contains "0001", the next value will be "0010", indicating that channel two has become the highest priority channel. Similarly, $PR_2$ 342 initially contains "0010", $PR_3$ 343 contains "0100", and $PR_4$ 344 contains "1000". The next values for $PR_2$ through $PR_4$ will be "0100", "1000", and "0001" respectively.

If either a RDY or REQ are not asserted for the highest priority channel as specified by $PR_1$ 341, but both are pending for the lower priority channel as (i.e. either $REQ_1$ 310 or $RDY_1$ 320 are not asserted, and $REQ_2$ 311 and $RDY_2$ 321 are asserted and $PR_2$="0010"), then $HIT_1$ 361 will be zero, $ROT_1$ 381 will be a '0', $HIT_2$ 372 will be non-zero and $ROT_2$ 382 will be a '1'. In this case, the contents of the four priority registers will be rotated by two bits. If $PR_1$ 341 contains "0001", the next state will be "0100" indicating that the highest priority channel for the next round of arbitration will be channel 3. Similarly, if $PR_2$ 342 contains "0010", the next state will be "1000" indicating that the second highest priority for the next round of arbitration will be channel 4. The rotating process continues through the remaining channels and is easily extensible to more than four channels.

Referring to FIG. 3A, a detailed view of the contents of one of the n priority registers 310A (previously presented in FIG. 3 as 341-344) in accordance with an embodiment of the present invention is presented. When a given bit of a priority register 310A is asserted, the data source/processing resource channel 340A to which that bit is mapped is assigned a priority equal to that of the priority register 310A. FIG. 3A shows a possible mapping of bit positions 331A to data source/processing resource channel numbers 350A. Bit positions a-d 330A depicted within the priority register 310A correspond to bit positions a-d 331A of the bit position/bit number/channel mapping table 320A. In turn, the bit positions 331A map to bit numbers 340A and data source/processing resource channels 350A. In the particular embodiment depicted in FIG. 3A, bit positions a-d 331A are mapped to bit numbers 3-0 340A respectively and data source/processing resource channels 4-1 350A. For example, if priority register 310A contained the binary number "0010", the asserted bit (i.e. the '1' located at the 'c' bit position) would be assigned as bit-number 1 and mapped to data source/processing resource channel 2.

Figure 4:
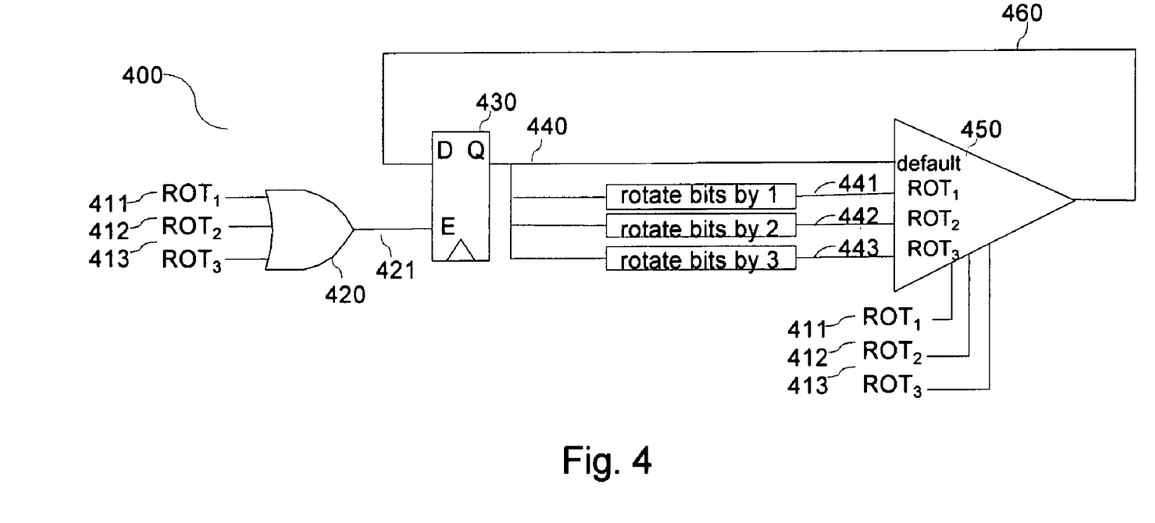
FIG. 4 depicts a schematic representation of the rotating priority register component of the RPQ.

Referring to FIG. 4, a schematic representation of a logic-gate level implementation of a rotating priority register 400 in accordance with an embodiment of the present invention is presented. The rotating priority register 400 is a detailed illustration of one of the priority registers 341-344 of FIG. 3. FIG. 4 depicts the design for the case of four input source channels. However, the design is easily extensible to n data source channels which correspond to n processing resource channels.

Input signals $ROT_1$-$ROT_3$ 411-413 correspond to output signals $ROT_1$-$ROT_3$ 381-383 of FIG. 3. Only one of $ROT_1$-$ROT_3$ 411-413 is asserted at any given time. The output 421 of OR gate 420 acts as the enable signal which permits the 4-bit register 430 to change states on a given clock tick. A switching device 450 dictates the next state of register 430. If none of the rotate signals 411-413 is asserted, the next state of register 430 is the same as the current state 440. If one of $ROT_1$-$ROT_3$ 411-413 is asserted, the next state 460 of register 430 is the result of the rotation calculation 441-443 associated with that signal. The input value for the calculation is the current state 440 of register 430.

For example, if the current state 440 of register 430 is the binary value "0100" and no rotate signal 411-413 is asserted, the enable signal 421 to the register 430 would be '0' and the register would not load a value on the next clock cycle. Additionally, the switching circuit would maintain the default value and the next state 460 of register 430 would remain "0100."

However, if the current state 440 of register 430 is the binary value "0100" and rotate signal $ROT_2$ 412 is asserted, the enable signal 421 to the register 430 would be '1' and the register would load a new value on the next clock cycle. The next state 460 of register 430 will correspond to the result of the rotation calculation 442 (i.e. rotating two bits would result in the value "0001") dictated by the asserted rotate signal $ROT_2$ 412.

Figure 5:
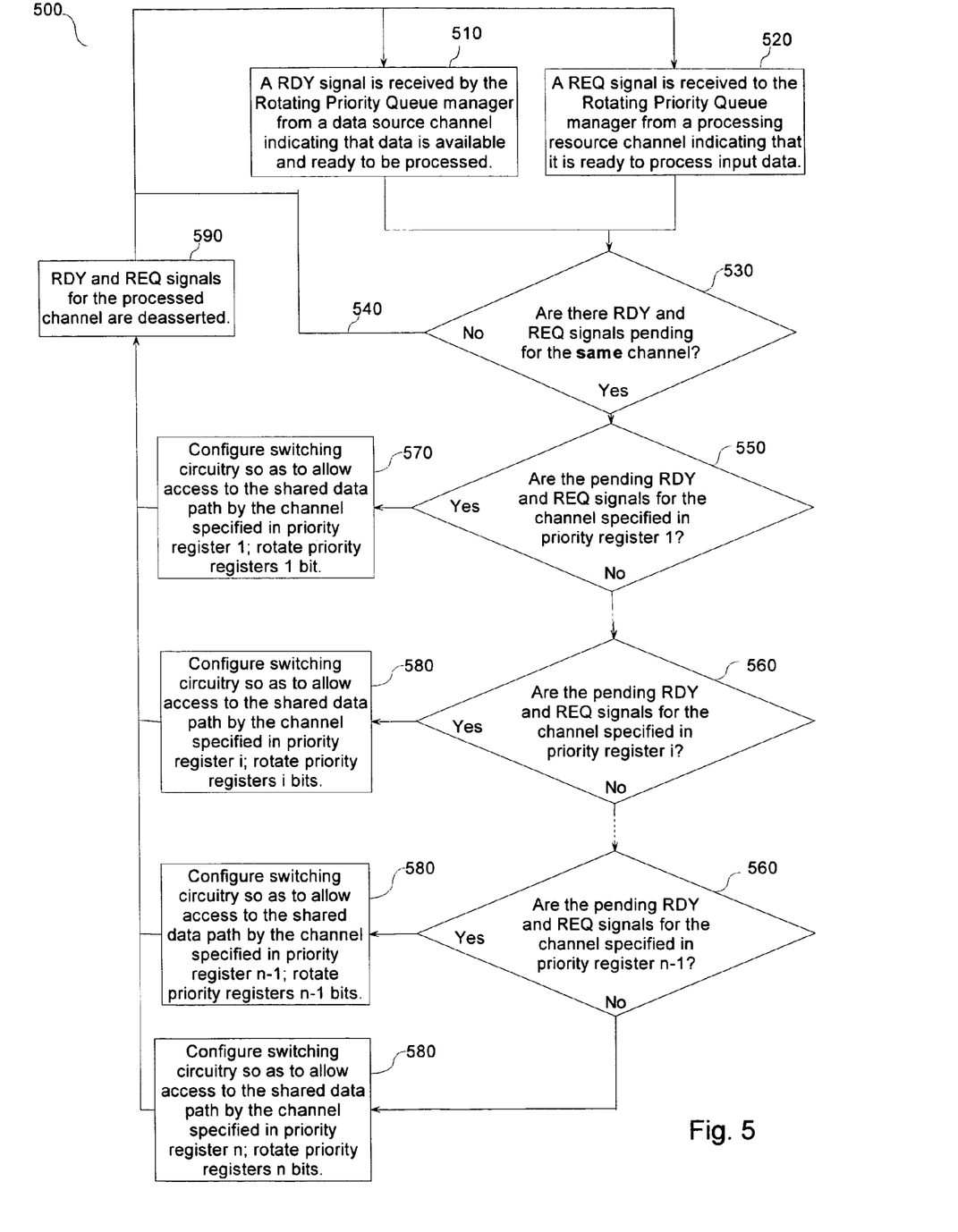
FIG. 5 depicts a method for arbitrating between a plurality of source data channels for routing to a plurality of processors in accordance with an embodiment of the present invention.

Referring to FIG. 5, a process flow chart detailing a method 500 for maintaining a Rotating Priority Queue (RPQ) in accordance with an embodiment of the present invention is presented. A ready (RDY) signal may be received 510 by the RPQ from a data source channel indicating that data on that channel is available and ready to be processed. Alternatively, a request (REQ) signal may be received 520 by the RPQ from a processing resource channel indicating that the processing resource on that channel is ready to receive and process data from its corresponding data source channel. It is also the case that multiple RDY and REQ signals may be asserted simultaneously. However, in order to process a given channel, both a RDY and a REQ must be pending for that channel. If no channels have had both a RDY and a REQ issued, the process loops 540 and waits for another RDY or REQ.

When a particular channel has both a RDY and a REQ pending, that channel is enqueued for processing. This channel number is compared to the value currently stored in Priority Register 1 ($PR_1$) 550. If the subject channel number is the same as that stored in $PR_1$, the bit corresponding to the subject channel number of the n-bit "select" (SEL) output signal is set as '1', all other bits are set as '0', and the contents of the priority registers $PR_1$ through $PR_4$ are rotated one bit 570.

If the subject channel number is not the same as that stored in $PR_1$, the channel number is compared to the successive priority registers $PR_2$-$PR_i$-$PR_n$ until a match is found 560. When a match is found, the bit of the n-bit SEL output signal corresponding to the channel number encoded in the $PR_i$ register is set as '1', all other bits are set as '0', and the contents of all PR registers are rotated i bits 580

Once the SEL bit has been set and the priority registers have been appropriately rotated, the RDY and REQ signals for the processed channel are deasserted 590 and the system waits for another pair of RDY and REQ signals to be asserted for a given channel.

It is believed that the present invention and many of its attendant advantages will be understood from the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for arbitrating access to a shared data path comprising:
    a plurality of n data sources;
    a plurality of n processing resources;
    a shared data path linking the plurality of data source channels and the plurality of processing resource channels;
    a rotating priority queue;
    switching circuitry; and
    interconnections linking the data sources, rotating priority queue, switching circuitry, shared data path and processing resources,
    wherein each data source corresponds to one processing resource,
    wherein each data source/processing resource pair has a common channel number designation,
    wherein the rotating priority queue controls access to the shared data path by the data source/processing resource pairs, and
    wherein the switching circuitry routes one of the n data sources across the shared data path to its corresponding processing resource channel.

2. The system of claim 1,
    wherein the maximum latency for access to the shared data path by any of the n data source/processing resource pairs is determinable.

3. The system of claim 1,
    wherein the rotating priority queue comprises:
        a plurality of n priority registers,
    wherein the priority queue receives input signals from the data sources and processing resources,
    wherein the priority queue transmits an output signal to the switching circuitry, and wherein each of the priority registers has an inherent priority with respect to the remaining n−1 priority registers.

4. The system of claim 1, wherein the plurality of data source channels and processing resource channels possess no inherent priority.

5. The system of claim 2, wherein the maximum latency for access to the shared data path by any of the n data source/processing resource pairs is only function of the number of channels.

6. The system of claim 3, wherein each of the priority registers is an n-bit register, wherein each of the priority registers maintains a binary value such that only one of the n-bits is asserted at any time, the least significant bit having a zero-position and the $n^{th}$ bit having an n−1-position, wherein no two priority registers have the same bit of their n-bit binary value asserted, and wherein the priority of a data source/processing resource pair at a given time is equal to that of the priority register whose asserted-bit-position corresponds to the common channel number of the channel pair.

7. The system of claim 3, wherein the input signal from a data source channel is asserted when the data source channel currently has data pending for processing, and wherein the input signal from a processing resource channel is asserted when the processing resource channel is currently available for accepting and processing data.

8. The system of claim 5, wherein the maximum latency for access to the shared data path by any of the n data source/processing resource pairs is n clock cycles.

9. The system of claim 6, wherein the next state of the priority registers is based on the current state of the registers.

10. The system of claim 6, wherein the next state of the priority registers is based on the input signals from the data source channels and the input signals from the processing resource channels.

11. The system of claim 6, wherein the next state of each priority register is calculated by rotating the binary value contained therein.

12. The system of claim 11, wherein the degree of rotation is based on the priority of the data source/processing resource channel pair which was most recently permitted to access the shared data path.

13. The system of claim 12, wherein, the asserted bit of each priority register is rotated i positions when the $i^{th}$-priority data source/processing resource channel pair is permitted access to the shared data path.

14. The system of claim 13, wherein the rotation is toward the most significant bit.

15. The system of claim 14, wherein the rotation is toward the least significant bit.

16. A method for arbitrating access to a shared data path, the method comprising:
receiving signals from a plurality of n data source channels,
receiving signals from a plurality of n processing resources,
waiting until signals from one or more data source channels and one or more processing resource channels are received, at least one data source channel and at least one processing resource channel having a common channel number;
comparing the at least one common channel number to contents of a plurality of n n-bit priority registers, each priority register having an inherent priority in relation to the other n−1 priority registers,
granting access to the shared data path by a data source/processing resource channel pair;
transitioning the priority registers to a next state; and
deasserting the signals from the data source channel and the processing resource channel of the data source/processing resource channel pair which is permitted to access the shared data path.

17. The method of claim 16, wherein the maximum latency for access to the shared data path by any of the n data source/processing resource channel pairs is determinable.

18. The method of claim 16, wherein the signals from the plurality of n data source channels indicate that at least one data source has data available for processing, and wherein the signals from the plurality of n processing resource channels indicate that at least one processing resource is ready to process input data.

19. The method of claim 16, wherein the step of comparing further comprises:
comparing the at least one common channel number to the contents of each of the plurality of n priority registers until at least one priority register's contents correspond to the at least one common channel number, the at least one priority register having an $i^{th}$ priority in relation to the other n−1 priority registers, i being from 1 to n.

20. The method of claim 16, wherein the switching circuitry is configured such that the data source/processing resource channel pair having the common channel number corresponding to the current highest-priority priority register is permitted to access the shared data path.

21. The method of claim 16, wherein the next state of the priority registers is based on the current state of the registers.

22. The method of claim 17, wherein the maximum latency for access to the shared data path by any of the n data source/processing resource channel pairs is a function only of the number of channels n.

23. The method of claim 19, wherein each of the n priority registers maintains an n-bit binary value such that only one of the n-bits is asserted at a given time, the least significant bit having the zero-position and the nth bit having the n−1-position, wherein no two priority registers of the n priority registers have the same bit of their n-bit binary value asserted, and wherein the at least one common channel number corresponds to the contents of a given priority register if the given priority register contains a value having an asserted-bit-position which equals the common channel number.

24. The method of claim 21, wherein the next state of the priority registers is based on the input signals from the data source channels and the input signals from the processing resource channels.

25. The method of claim 22, wherein the maximum latency for access to the shared data path by any of the data source/processing resource channel pairs is n clock cycles.

26. The method of claim 24, wherein the next state of the priority registers is determined by rotating the binary numbers contained in the registers.

27. The method of claim 26,
wherein the degree of rotation is based on the priority of the data source/processing resource channel pair which was most recently permitted to access the shared data path.

28. The method of claim 27,
wherein, the asserted bit of each priority register is rotated i positions when the $i^{th}$-priority data source/processing resource channel pair is permitted access to the shared data path.

29. The method of claim 28,
wherein the rotation is toward the most significant bit.

30. The method of claim 28,
wherein the rotation is toward the least significant bit.

* * * * *